United States Patent
Zeng et al.

(10) Patent No.: US 11,494,869 B2
(45) Date of Patent: Nov. 8, 2022

(54) **IMAGE PROCESSOR HAVING A COMPRESSING ENGINE PERFORMING OPERATIONS ON EACH ROW OF M*N DATA BLOCK**

(71) Applicant: REALTEK SEMICONDUCTOR CORPORATION, Hsinchu (TW)

(72) Inventors: Weimin Zeng, Hsinchu (TW); Jeng-Shiou Lai, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 288 days.

(21) Appl. No.: 17/039,546

(22) Filed: Sep. 30, 2020

(65) Prior Publication Data

US 2022/0101484 A1    Mar. 31, 2022

(51) Int. Cl.
   *G06T 1/00* (2006.01)
   *G06T 1/60* (2006.01)
   *G06F 12/08* (2016.01)
   *G06T 3/40* (2006.01)
   *G06T 9/00* (2006.01)

(52) U.S. Cl.
   CPC .............. *G06T 1/60* (2013.01); *G06F 12/08* (2013.01); *G06T 3/40* (2013.01); *G06T 9/00* (2013.01)

(58) Field of Classification Search
   CPC ... G06F 12/08; G06T 3/40; G06T 9/00; G06T 1/60
   See application file for complete search history.

(56) References Cited

U.S. PATENT DOCUMENTS

| | | | |
|---|---|---|---|
| 9,373,176 B2 * | 6/2016 | Wu | H04N 19/182 |
| 9,596,477 B2 * | 3/2017 | Chou | H04N 19/436 |
| 2010/0128797 A1 * | 5/2010 | Dey | H04N 19/61 |
| | | | 375/240.24 |
| 2015/0187045 A1 | 7/2015 | Chou et al. | |

FOREIGN PATENT DOCUMENTS

TW    201939953 A    10/2019

OTHER PUBLICATIONS

English abstract of TW201939953A.

* cited by examiner

*Primary Examiner* — Tammara R Peyton
(74) *Attorney, Agent, or Firm* — WPAT, P.C., Intellectual Property Attorneys; Anthony King

(57) ABSTRACT

The present application provides a method for storing an image frame in a memory, including: receiving the image frame; dividing the image frame into M rows of data block rows along a first direction; dividing each of the M rows of data block rows into N data blocks along a second direction perpendicular to the first direction; performing a compression operation upon each of the M*N data blocks individually to generate M*N compressed data blocks; and storing N compressed data blocks corresponding to the 1st data block row of the M data block rows and N compressed data blocks corresponding to the $(P+1)^{th}$ data block row of the M data block rows in a continuous storage space in the memory, wherein M, N, and P are integers, and M>1, N>0 and P<M.

20 Claims, 3 Drawing Sheets

IMAGE PROCESSOR HAVING A COMPRESSING ENGINE PERFORMING OPERATIONS ON EACH ROW OF M*N DATA BLOCK

TECHNICAL FIELD

The present application relates to an image processor; in particular, to an image processor for storing an image frame in a memory and a method of the same.

BACKGROUND

Recently, due to the development of networks and effective displays, the amount of multimedia data is rapidly increasing. In case of video (i.e., moving pictures, moving images, etc.), conventionally, video with SD grade resolution (480p) was the mainstream, but currently, Full-HD video with a resolution of (1080p) and video beyond the HD grade (720p) is being generalized. Therefore, how to improve the efficiency of memory usage during image data processing has become a pressing issue in the related art.

SUMMARY OF THE INVENTION

Some embodiments of the present disclosure provide a method for storing an image frame in a memory. The method includes: receiving the image frame; dividing the image frame into M rows of data block rows along a first direction; dividing each of the M rows of data block rows into N data blocks along a second direction perpendicular to the first direction; performing a compression operation upon each of the M*N data blocks individually to generate M*N compressed data blocks; and storing N compressed data blocks corresponding to the 1st data block row of the M data block rows and N compressed data blocks corresponding to the $(P+1)^{th}$ data block row of the M data block rows in a continuous storage space in the memory, wherein M, N, and P are integers, and M>1, N>0 and P<M.

Some embodiments of the present disclosure provide an image processor for storing an image frame in a memory. The image processor includes: a compression engine, for receiving the image frame, dividing the image frame into M rows of data block rows along a first direction, dividing each of the M rows of data block rows into N data blocks along a second direction perpendicular to the first direction, and performing a compression operation upon each of the M*N data blocks individually to generate M*N compressed data blocks; and a control unit, for storing N compressed data blocks corresponding to the $1^{st}$ data block row of the M data block rows and N compressed data blocks corresponding to the $(P+1)^{th}$ data block row of the M data block rows in a continuous storage space in the memory, wherein M, N, and P are integers, and M>1, N>0 and P<M.

The above methods and image processor not only improves the efficiency of usage of the memory, but further saves the transmission bandwidth and reduces the overall power consumption.

BRIEF DESCRIPTION OF THE DRAWINGS

FIG. 3 is the arrangement of the compressed image frame in the memory according to an embodiment of the present application.

DETAILED DESCRIPTION

Figure 1:
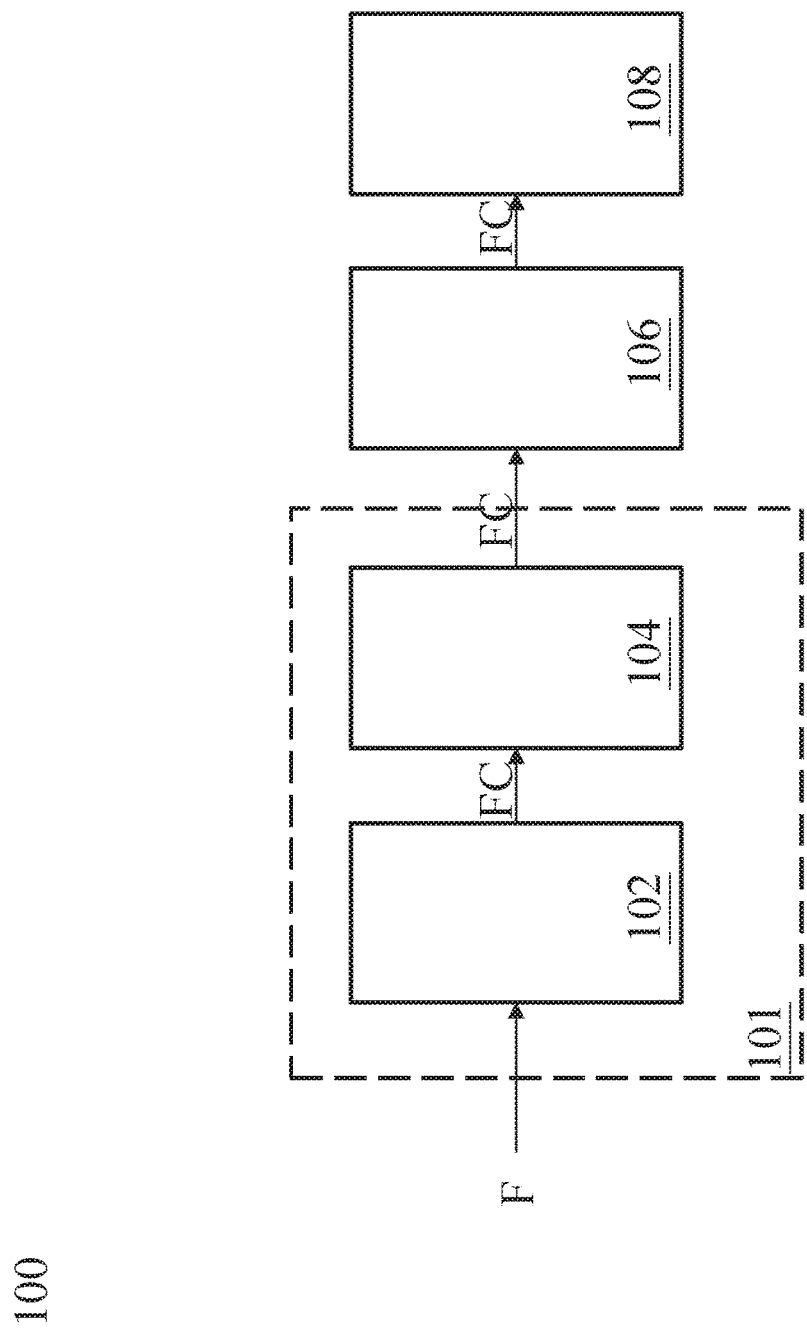
FIG. 1 is a diagram illustrating an image processor applied in a system according to an embodiment of the present application.

FIG. 1 is a diagram illustrating an image processor 101 applied in a system 100 according to an embodiment of the present application. The system 100 includes the image processor 101, a memory 106 and a display 108, wherein the memory 106 is coupled between the image processor 101 and the display 108. In the present embodiment, the memory 106 and the image processor 101 are disposed in different chips. That is to say, for the image processor 101, the memory 106 is an external memory. In the present embodiment, the memory 106 is a dynamic random-access memory (DRAM), but the present application is not limited thereto.

The image processor 101 includes a compression engine 102 and a control unit 104. The compression engine 102 is used for receiving at least one image frame F of an image and/or a film and performing a compression operation on the image frame F. In the present embodiment, the compression operation is based on a lossless compression algorithm. The control unit 104 is used for storing the compressed image frame FC in the memory 106, and then the compressed image frame FC is transmitted to the display 108 for displaying. In the present application, the control unit 104 utilizes an improved method to arrange the compressed image frame FC in the memory 106, which not only improves the efficiency of usage of the memory 106, but further saves the transmission bandwidth between the memory 106 and the display 108 and reduces the overall power consumption of the system 100. The details are provided below.

Figure 2:
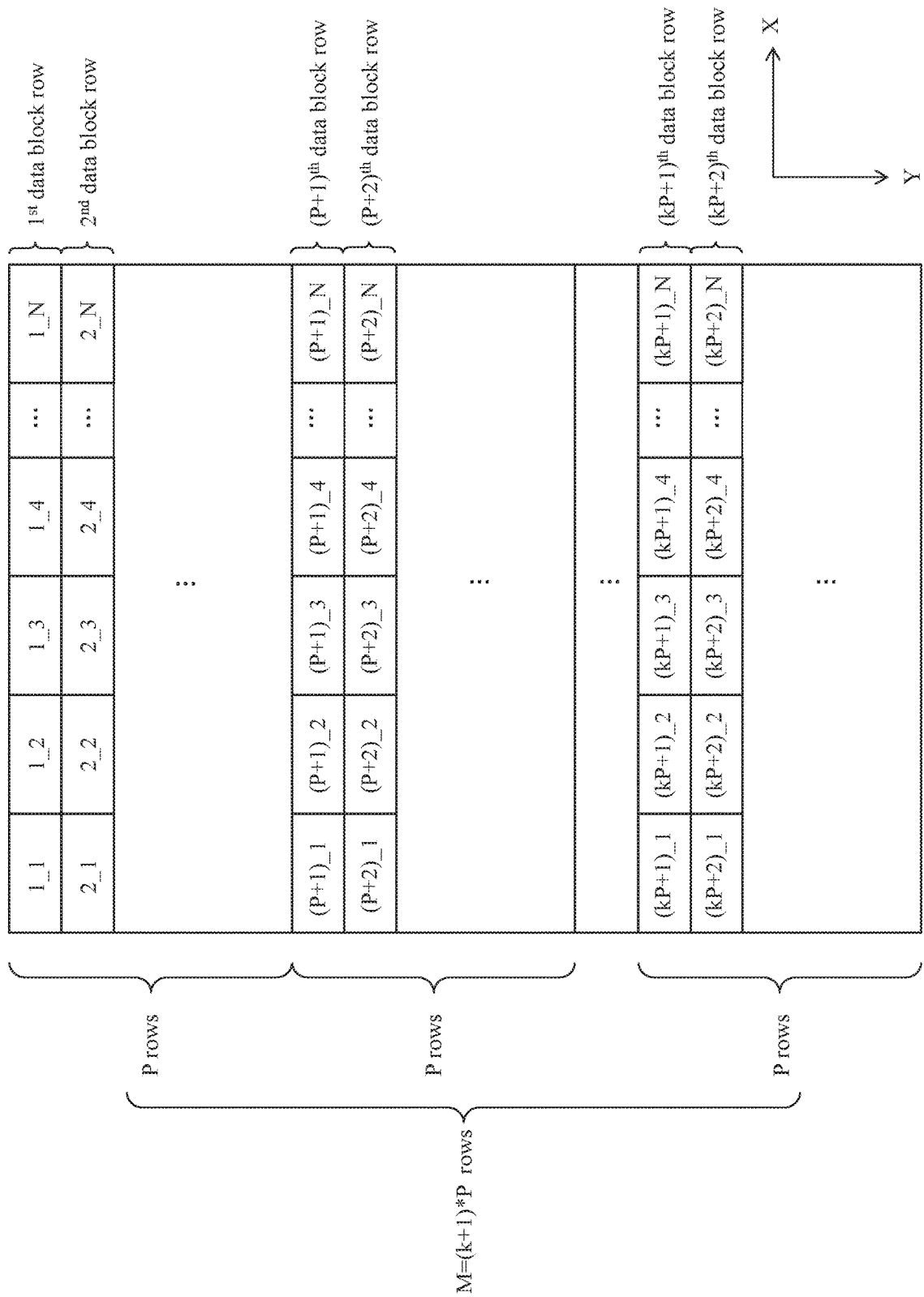
FIG. 2 is the image frame received by the compression engine according to an embodiment of the present application.

FIG. 2 is the image frame F received by the compression engine 102 according to an embodiment of the present application. The compression engine 102 divides the image frame F into a plurality of data blocks with fixed size. For example, each data block has a same length of 16 pixels along a direction X, and has a same width of 4 pixels along a direction Y. After division, the image frame F includes N columns of data blocks columns with respect to the direction X, and includes M rows of data blocks rows with respect to the direction Y, wherein the direction X is perpendicular to the direction Y, and N and M are integers greater than 0.

Next, the compression engine 102 performs the compression operation upon each of the M*N data blocks in the image frame F individually to generate M*N compressed data blocks. In the present embodiment, a Z-scan method is employed to sequentially perform the compression operation upon each of the M*N data blocks. For example, the compression operation may be performed upon the image frame F by an order of data block 1_1, 1_2, 2_1, 2_2, 1_3, 1_4, 2_3, 2_4 . . . . However, the order is not a limitation of the present application. After the compression operation, widths of the M*N compressed data blocks along the direction Y are fixed and the same, e.g., a width of 1 pixel; and lengths of the M*N compressed data blocks along the direction X are not the same. In other words, any two of lengths of the M*N compressed data blocks may have different lengths.

Figure 3:
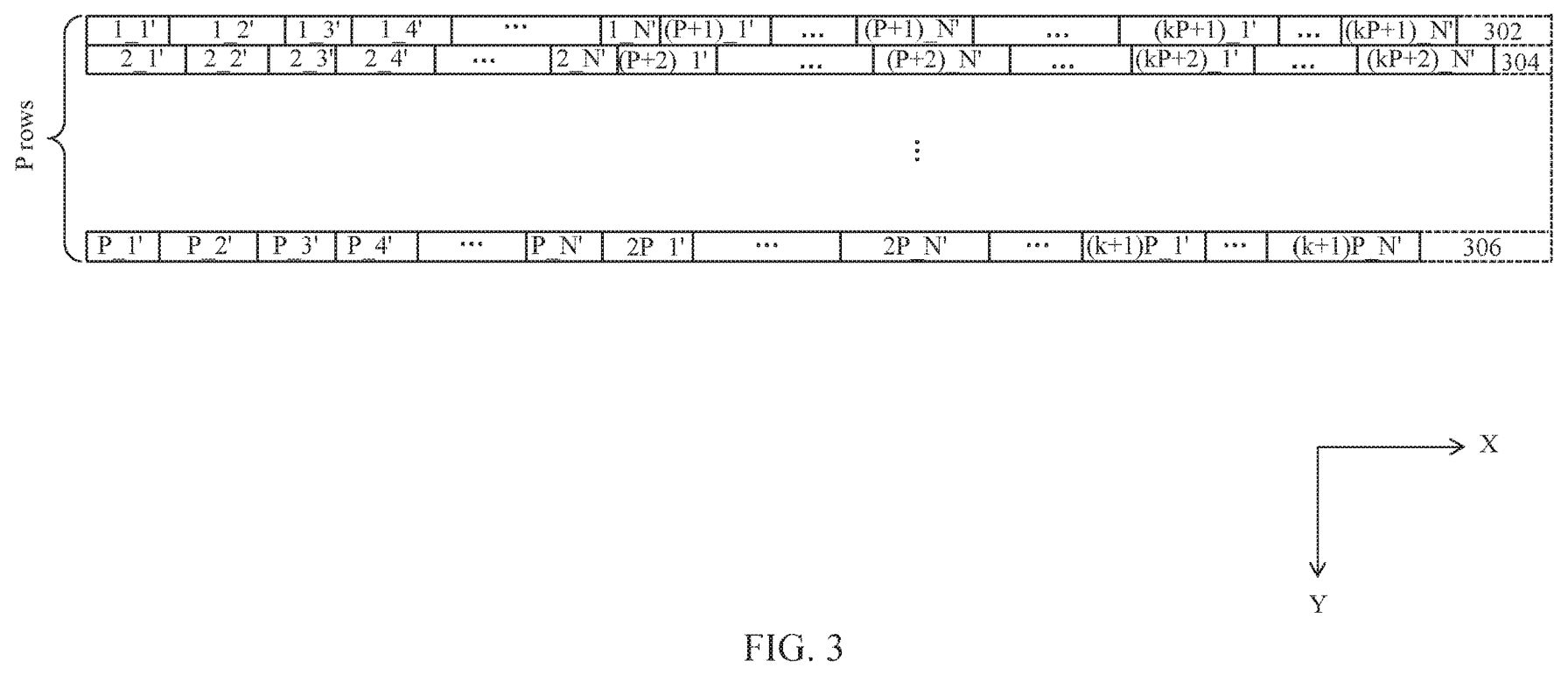

The control unit 104 stores a plurality of compressed data blocks, which corresponds to a first set of data block rows, of the M*N compressed data block in a continuous storage space in the memory 106. As shown in FIG. 3, a first compressed data block row in FIG. 3 corresponds to the first set of data block rows, the notation 1_1' shown in FIG. 3 refers to the compressed data block obtained by performing the compression operation upon the data block 1_1, and so on. The first set of data block rows includes the $(n*P+1)^{th}$ data block row of FIG. 2, wherein P is an integer greater than 0, and n and k are integers and $0 \leq n \leq k$. In other words, the first set of data block rows includes (k+1) rows of data block rows including the $1^{st}$ data block row, the $(P+1)^{th}$ data block row, . . . , and the $(k*P+1)^{th}$ data block row. The first set of data block rows are equally distanced with respect to the direction Y. In the embodiment of the present disclosure shown in FIG. 3, the M, N, and P are integers, and M>1, N>0 and P<M.

Specifically, after allocating a first set of continuous addresses in the memory 106 to the N compressed data bock obtained from performing the compression operation upon the N data blocks of the $1^{st}$ data block row, the control unit 104 further allocating a second set of addresses in the memory 106 to the N compressed data bock obtained from performing the compression operation upon the N data blocks of the $(P+1)^{th}$ data block row. The second set of continuous addresses is immediately following the first set of continuous addresses, so that an address of the compressed data block (P+1)_1' and an address of the compressed data block 1_N' are continuous. A same way is also applied for the arrangement of the remaining compressed data blocks corresponding to the first set of data block rows; therefore the first compressed data block row in FIG. 3 has total N*(k+1) compressed data blocks with continuous addresses.

Similarly, the control unit 104 stores a plurality of compressed data blocks, which correspond to a second set of data block rows, of the M*N compressed data block in a continuous storage space in the memory 106, i.e. the second compressed data block row in FIG. 3. The second set of data block rows includes the $(n*P+2)^{th}$ data block row of FIG. 2. Bases on this rule, P rows of compressed data block rows are obtained as shown in FIG. 3, wherein each compressed data block row is stored in a continuous space of the memory 106, and the space for each compressed data block row is not adjacent to the space for the compressed data block rows neighboring thereto. That is, the address allocated to the compressed data block 2_1' is not immediately following the address allocated to the compressed data block (k*P+1)_N'; as shown in FIG. 3, there is a dummy storage space 302 following the compressed data block (k*P+1)_N'. To put it another way, the compressed data block 2_1' and the compressed data block (k*P+1)_N' are separated by at least the dummy storage space 302. The address allocated to the compressed data block 3_1' is not immediately following the address allocated to the compressed data block (k*P+2)_N', and there is a dummy storage space 304 following the compressed data block (k*P+2)_N'. To put it another way, the compressed data block 3_1' and the compressed data block (k*P+2)_N' are separated by at least the dummy storage space 304, and so forth. The compressed data block rows may have following dummy storage spaces with different lengths along the direction X. Compared to the normal way, the above method is able to reduce the wasted dummy storage space in the memory 106 to make the efficiency of usage of the memory 106 better.

Please note that in FIG. 2 and FIG. 3, the image frame received by the compression engine and the arrangement of the compressed image frame in the memory are illustrated in the block mode (i.e. 2-dimensional mode) for better understanding. However, before the transfer of the image frame from the compression engine 102 to the control unit 104 and/or the transfer of the compressed image frame from the control unit 104 to the memory 106, a serialization process may be employed so that the transfer can be performed in the sequential mode (i.e. 1-dimensional mode).

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of embodiments introduced herein. It should be understood that the steps mentioned in the flowchart of the method of the present application can be adjusted in accordance with the actual needs except for those whose sequences are specifically stated, and can even be executed simultaneously or partially simultaneously. In addition, the above-mentioned modules or method steps can be implemented by hardware, software or firmware according to the designer's needs. Those skilled in the art should also realize that such equivalent embodiments still fall within the spirit and scope of the present disclosure, and they may make various changes, substitutions, and alterations thereto without departing from the spirit and scope of the present disclosure.

What is claimed is:

1. A method for storing an image frame in a memory, the method comprising:
    receiving the image frame;
    dividing the image frame into M rows of data block rows along a first direction;
    dividing each of the M rows of data block rows into N data blocks along a second direction perpendicular to the first direction;
    performing a compression operation upon each of the M*N data blocks individually to generate M*N compressed data blocks; and
    storing N compressed data blocks corresponding to the $1^{st}$ data block row of the M data block rows and N compressed data blocks corresponding to the $(P+1)^{th}$ data block row of the M data block rows in a continuous storage space in the memory,
    wherein M, N, and P are integers, and M>1, N>0 and P<M.

2. The method of claim 1, wherein widths of the M*N data blocks along the first direction are the same, and lengths of the M*N data blocks along the second direction are the same.

3. The method of claim 2, wherein widths of the M*N compressed data blocks along the first direction are the same, and at least two of lengths of the M*N compressed data blocks along the second direction are not the same.

4. The method of claim 3, wherein the storing the N compressed data blocks corresponding to the $1^{st}$ data block row and the N compressed data blocks corresponding to the $(P+1)^{th}$ data block row in the continuous storage space in the memory comprises:
    storing k*N compressed data blocks corresponding to a first set of data block rows of the M data block rows in a continuous storage space in the memory, wherein the first set of data block rows include the $(n*P+1)^{th}$ data block row, wherein $0 \leq n \leq k$, and n and k are integers.

5. The method of claim 4, further comprising:
    storing N compressed data blocks corresponding to the $2^{nd}$ data block row of the M data block rows and N compressed data blocks corresponding to the $(P+2)^{th}$ data block row of the M data block rows in a continuous storage space in the memory.

6. The method of claim 5, wherein the storing the N compressed data blocks corresponding to the $2^{nd}$ data block row and the N compressed data blocks corresponding to the $(P+2)^{th}$ data block row in the continuous storage space in the memory comprises:

storing k*N compressed data blocks corresponding to a second set of data block rows of the M data block rows in a continuous storage space in the memory, wherein the second set of data block rows include the $(n*P+2)^{th}$ data block row, wherein $0 \leq n \leq k$, and n and k are integers.

7. The method of claim 6, further comprising:

separating the continuous storage space for the k*N compressed data blocks corresponding to the first set of data block rows from the continuous storage space for the k*N compressed data blocks corresponding to the second set of data block rows by a dummy storage space in the memory.

8. The method of claim 4, wherein the storing k*N compressed data blocks corresponding to the first set of data block rows of the M data block rows in the continuous storage space in the memory comprises:

allocating the k*N compressed data blocks corresponding to the first set of data block rows of the M data block rows to continuous addresses of the memory.

9. The method of claim 6, wherein the storing k*N compressed data blocks corresponding to the second set of data block rows of the M data block rows in the continuous storage space in the memory comprises:

allocating the k*N compressed data blocks corresponding to the second set of data block rows of the M data block rows to continuous addresses of the memory.

10. The method of claim 1, wherein the compression operation is based on a lossless compression algorithm.

11. An image processor for storing an image frame in a memory, the image processor comprising:

a compression engine, for receiving the image frame, dividing the image frame into M rows of data block rows along a first direction, dividing each of the M rows of data block rows into N data blocks along a second direction perpendicular to the first direction, and performing a compression operation upon each of the M*N data blocks individually to generate M*N compressed data blocks; and a control unit, for storing N compressed data blocks corresponding to the $1^{st}$ data block row of the M data block rows and N compressed data blocks corresponding to the $(P+1)^{th}$ data block row of the M data block rows in a continuous storage space in the memory, wherein M, N, and P are integers, and M>1, N>0 and P<M.

12. The image processor of claim 11, wherein widths of the M*N data blocks along the first direction are the same, and lengths of the M*N data blocks along the second direction are the same.

13. The image processor of claim 12, wherein widths of the M*N compressed data blocks along the first direction are the same, and at least two of lengths of the M*N compressed data blocks along the second direction are not the same.

14. The image processor of claim 13, wherein the control unit is further for storing k*N compressed data blocks corresponding to a first set of data block rows of the M data block rows in a continuous storage space in the memory, wherein the first set of data block rows include the $(n*P+1)^{th}$ data block row, wherein $0 \leq n \leq k$, and n and k are integers.

15. The image processor of claim 14, wherein the control unit is further for storing N compressed data blocks corresponding to the $2^{nd}$ data block row of the M data block rows and N compressed data blocks corresponding to the $(P+2)^{th}$ data block row of the M data block rows in a continuous storage space in the memory.

16. The image processor of claim 15, wherein the control unit is further for storing k*N compressed data blocks corresponding to a second set of data block rows of the M data block rows in a continuous storage space in the memory, wherein the second set of data block rows include the $(n*P+2)^{th}$ data block row, wherein $0 \leq n \leq k$, and n and k are integers.

17. The image processor of claim 16, wherein the control unit is further for separating the continuous storage space for the k*N compressed data blocks corresponding to the first set of data block rows from the continuous storage space for the k*N compressed data blocks corresponding to the second set of data block rows by a dummy storage space in the memory.

18. The image processor of claim 14, wherein the control unit is further for allocating the k*N compressed data blocks corresponding to the first set of data block rows of the M data block rows to continuous addresses of the memory.

19. The image processor of claim 16, wherein the control unit is further for allocating the k*N compressed data blocks corresponding to the second set of data block rows of the M data block rows to continuous addresses of the memory.

20. The image processor of claim 11, wherein the compression operation is based on a lossless compression algorithm.

* * * * *